(12) United States Patent
Katsumi

(10) Patent No.: US 9,319,650 B2
(45) Date of Patent: Apr. 19, 2016

(54) DEVICE AND METHOD FOR DISPLAYING INFORMATION IN LIGHT ILLUMINATED AREA AHEAD OF VEHICLE

(71) Applicant: DENSO CORPORATION, Kariya, Aichi-pref. (JP)

(72) Inventor: Yoshiaki Katsumi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/401,575

(22) PCT Filed: May 17, 2013

(86) PCT No.: PCT/JP2013/063765
§ 371 (c)(1),
(2) Date: Nov. 17, 2014

(87) PCT Pub. No.: WO2013/172445
PCT Pub. Date: Nov. 21, 2013

(65) Prior Publication Data
US 2015/0163470 A1 Jun. 11, 2015

(30) Foreign Application Priority Data
May 17, 2012 (JP) ................................. 2012-113583

(51) Int. Cl.
*H04N 7/18* (2006.01)
*H04N 9/31* (2006.01)
(Continued)

(52) U.S. Cl.
CPC .............. *H04N 9/3185* (2013.01); *B60Q 1/085* (2013.01); *B60Q 1/18* (2013.01); *B60Q 9/00* (2013.01);
(Continued)

(58) Field of Classification Search
CPC ............. B06Q 1/085; B06Q 2300/056; B06Q 2300/23; B06Q 2300/132; B06Q 2300/45; B06Q 1/18; F21S 48/1757
See application file for complete search history.

(56) References Cited

U.S. PATENT DOCUMENTS

2004/0189447 A1 9/2004 Okubo et al.
2004/0218401 A1 11/2004 Okubo et al.
(Continued)

FOREIGN PATENT DOCUMENTS

CN 1716313 A 1/2006
JP H05238307 A 9/1993
(Continued)

OTHER PUBLICATIONS

International Search Report (in Japanese with English Translation) for PCT/JP2013/063765, mailed Aug. 20, 2013; ISA/JP.
(Continued)

*Primary Examiner* — Victor Kostak
(74) *Attorney, Agent, or Firm* — Harness, Dickey & Pierce, P.L.C.

(57) ABSTRACT

A device includes a DMD (digital mirror device) that displays an icon in an illuminated area on a road surface by controlling contrast of light generated by a light source for a headlight that illuminates ahead of vehicle, an in-cabin camera that obtains a driver's eye position, and a display control unit that controls a shape of the icon displayed by the DMD so that the shape of the icon is not distorted when viewed from the driver's eye position by using a difference between a reflection position of a reflected light by the DMD and the driver's eye position obtained by the in-cabin camera.

9 Claims, 3 Drawing Sheets

(51) Int. Cl.
- *B60Q 1/08* (2006.01)
- *B60Q 1/18* (2006.01)
- *B60Q 9/00* (2006.01)
- *G06F 3/01* (2006.01)

(52) U.S. Cl.
CPC .......... *G06F 3/013* (2013.01); *B60Q 2300/132* (2013.01); *B60Q 2300/23* (2013.01); *B60Q 2400/50* (2013.01)

(56) References Cited

U.S. PATENT DOCUMENTS

| | | | | |
|---|---|---|---|---|
| 2008/0130302 A1* | 6/2008 | Watanabe | ............... | B60Q 1/085 362/466 |
| 2008/0144326 A1* | 6/2008 | Watanabe | ............... | B60Q 1/085 362/466 |
| 2010/0208478 A1* | 8/2010 | Fang | ...................... | B60Q 1/085 362/466 |
| 2011/0012511 A1* | 1/2011 | Watanabe | ............... | B60Q 1/085 315/82 |
| 2012/0158254 A1* | 6/2012 | Takagaki | ............... | B60Q 1/085 701/49 |

FOREIGN PATENT DOCUMENTS

| JP | 4059079 B2 | 3/2008 |
|---|---|---|
| JP | 2010211404 A | 9/2010 |

OTHER PUBLICATIONS

International Preliminary Report on Patentability for PCT/JP2013/063765 (in Japanese with English Translation), issued Nov. 18, 2014; ISA/JP.

Office Action dated Dec. 28, 2015 issued in the corresponding CN application No. 201380025119.8 in Chinese with English translation.

* cited by examiner

DEVICE AND METHOD FOR DISPLAYING INFORMATION IN LIGHT ILLUMINATED AREA AHEAD OF VEHICLE

CROSS REFERENCE TO RELATED APPLICATIONS

This application is a U.S. National Phase Application under 35 U.S.C. 371 of International Application No. PCT/JP2013/063765 filed on May 17, 2013 and published in Japanese as WO 2013/172445 A1 on Nov. 21, 2013. This application is based on and claims the benefit of priority from Japanese Patent Application No. 2012-113583 filed on May 17, 2012. The entire disclosures of all of the above applications are incorporated herein by reference.

BACKGROUND

1. Technical Field

The present invention relates to a device and a method for displaying information in an illuminated area ahead of vehicle. More specifically, the present invention relates to a device which is mounted in a vehicle and is configured to display information such as characters or icons in a light illuminated area on a road surface and a method of displaying the same.

2. Background Art

Display devices are known, for example, as disclosed in Japanese Patent No. 4059079. In the disclosed device, a reflection type digital light deflector reflects light from a light source such as a halogen lamp. When the light is reflected, contrast is added to the reflected light to display characters or icons in an illuminated area ahead of vehicle.

JP-B-4059079

Technical Problem

However, there is a problem that characters or icons displayed on the road surface are distorted when viewed by the driver since the illuminating position where the light is emitted from the headlight onto the road surface is different from the driver's eye position at which the driver reads the information on the road surface, and also, since a pitch angle of the vehicle may vary.

SUMMARY

Accordingly, there is a need of a vehicle-mounted illumination device which displays characters or icons on a surface illuminated by the headlight without distortion to the driver and a method of displaying the same.

According to a typical example, a vehicle-mounted illumination device which includes a light source, display means, eye position obtaining means, reflection position obtaining means, pitch angle obtaining means and display control means is provided.

The light source is a light source for a headlight that illuminates ahead of vehicle, and the display means display an icon in an illuminated area by controlling the contrast of light generated by the light source.

The eye position obtaining means obtain a driver's eye position, and the reflection position obtaining means obtain a reflection position of a reflected light, which is displayed by the display means.

The display control means control a shape of the icon displayed by the display means so that the shape of the icon is not distorted when viewed from the driver's eye position by using a difference between the driver's eye position obtained by the eye position obtaining means and the reflection position of the reflected light obtained by the reflection position obtaining means.

According to the foregoing vehicle-mounted illumination device, a character or icon can be displayed on the illuminated surface illuminated by the headlight without distortion to the driver. The reason for that will be described below.

When the headlight illuminates the road surface to display a character or icon by adding contrast of light on the road surface, the position of the light source is different from the driver's eye position. As a result, the character or icon displayed on the road surface is distorted when viewed by the driver.

In order to address that problem, the display control means controls a shape of the icon displayed by the display means so that the shape of the icon is not distorted when viewed from the driver's eye position by using a difference between the driver's eye position obtained by the eye position obtaining means and the reflection position obtained by the reflection position obtaining means. As a consequence, the icon can be displayed without distortion to the driver.

Further, since the angle of the illuminated surface illuminated by the headlight varies depending on the inclination of the road surface during traveling of the vehicle, characters or the like displayed on the illuminated surface are distorted when viewed by the driver. According to another example, the above described configuration may include a pitch angle obtaining means that obtains a pitch angle of the vehicle, and the display control means may control the shape of the icon displayed by the display means so that the shape of the icon is not distorted when viewed from the driver's eye position by using the pitch angle obtained by the pitch angle obtaining means in addition to the difference between the driver's eye position obtained by the eye position obtaining means and the reflection position of the reflected light obtained by the reflection position obtaining means. As a consequence, the icon can be displayed without distortion to the driver regardless of change in pitch angle of the vehicle.

Still further, the driver's eye position varies depending on the driver's sitting height or the position of the driver's seat. In light of that, a camera may be mounted at a predetermined position in the vehicle cabin so that the driver's eye position may be obtained from the image of the driver captured by the camera by image processing performed by the image processing means.

Accordingly, since the mounted position of the cabin camera is a predetermined value, the driver's eye position can be obtained from the image of the driver captured by the camera.

Further, since the display means is a digital mirror device which includes a plurality of micromirrors arranged in a matrix fashion and which controls contrast of light generated by the light source by reflecting or not reflecting the light generated by the light source, the vehicle-mounted illumination device can be easily reduced in size.

DETAILED DESCRIPTION OF THE PREFERRED EMBODIMENTS

It should be noted that the embodiment of the present invention is not limited to the embodiment described below, and various forms can be made in the technical scope of the present invention.

First Embodiment

Figure 1:
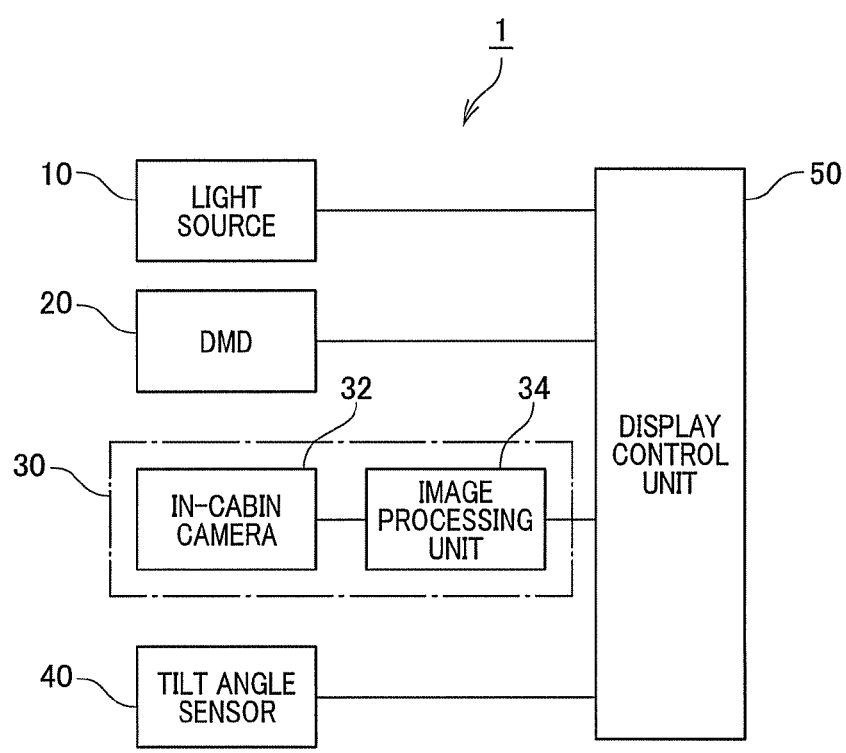
FIG. 1 is a block diagram which shows a schematic configuration of a vehicle-mounted illumination device according to the present invention.

With reference to FIG. 1, a vehicle-mounted illumination device 1 to which a device and method of the present invention is applied will be described.

As shown in FIG. 1, the vehicle-mounted illumination device 1 includes a light source 10, a digital mirror device 20 (hereinafter, also referred to as DMD 20), a driver's eye position obtaining section 30, a tilt angle sensor 40 and a display control unit 50.

This vehicle-mounted illumination device is a system that realizes "a device and a method for displaying information in a light illuminated area ahead of vehicle."

The light source 10 is a light source for a headlight that illuminates ahead of a vehicle 5 and may be a metal halide lamp, a halogen lamp or LEDs.

The DMD 20 is a device for displaying an icon in an illuminated area (illuminated field of view) by controlling contrast of light generated by the light source 10 and is incorporated in the headlight.

The DMD 20 is a so-called digital mirror device which includes a plurality of micromirrors arranged in a matrix fashion so that each of the micromirrors controls the contrast of light generated by the light source 10 by reflecting or not reflecting the light so as to display a character or icon in the illuminated area on the road surface and the like.

The eye position obtaining section 30 is a device that obtains a driver's eye position and includes an in-cabin camera 32 and an image processing unit 34.

The in-cabin camera 32 is, for example, a small CCD camera and is mounted at a predetermined upper front position in the vehicle cabin at a predetermined angle so as to capture an image of the driver's face.

The image processing unit 34 is configured to extract the driver's eye position from the driver's face image which is captured by the in-cabin camera 32 by a known image processing such as binarization or edge detection. Then, the extracted driver's eye position in the driver's face image (for example, deviation from the center of the image) is calculated.

Since the in-cabin camera 32 is mounted at a predetermined position in the vehicle cabin, the height of the in-cabin camera 32 from the road surface is known. Further, since the in-cabin camera 32 is mounted with a predetermined angle, the height of the center of the captured image can be calculated.

Accordingly, the driver's eye position from the road surface can be calculated based on the driver's eye position in the driver's image determined by the image processing.

The tilt angle sensor 40 is a so-called angular sensor and is mounted in the vehicle 5 so as to obtain a pitch angle of the vehicle 5.

The display control unit 50 includes a CPU, a ROM serving as a non-transitory computer readable medium, RAMs and I/Os, which are not shown in the figure, and a reflection position of the reflected light performed by the DMD 20, that is, a mounted position of the DMD 20 in the vehicle 5 including the height of the DMD 20 from the road surface is stored in the ROM in advance.

The display control unit 50 controls the shape of the icon displayed by the DMD 20 so that the shape of the icon is not distorted when viewed from the driver's eye position by using a difference between the driver's eye position obtained by the eye position obtaining section 30 and the reflection position stored in the ROM.

Further, the display control unit 50 controls the shape of the icon displayed by the DMD 20 so that the shape of the icon is not distorted when viewed from the driver's eye position by using the pitch angle of the vehicle 5 obtained by the tilt angle sensor 40 in addition to the driver's eye position obtained by the eye position obtaining section 30 and the mounted position of the DMD 20 stored in the ROM.

Description of Display Control Processing

Figure 2:
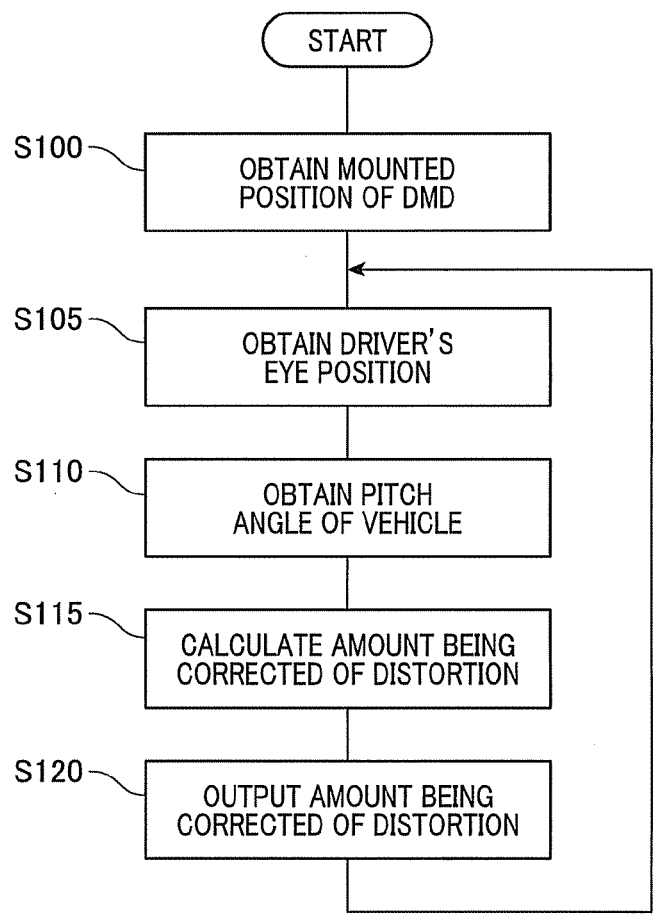
FIG. 2 is a flow diagram which shows a flow of a display control processing.

Next, with reference to FIGS. 2 and 3, a display control process performed by the display control unit 50 will be described. The display control processing starts when the display control unit 50 is turned on. As shown in FIG. 2, a mounted position of the DMD 20 in the vehicle 5 is first obtained in step S100, and subsequently, a driver's eye position is obtained by the eye position obtaining section 30 in step S105.

Then, a pitch angle of the vehicle 5 is obtained by the tilt angle sensor 40 in step S110, and subsequently, a distortion correction amount is calculated in step S115.

Figure 3:
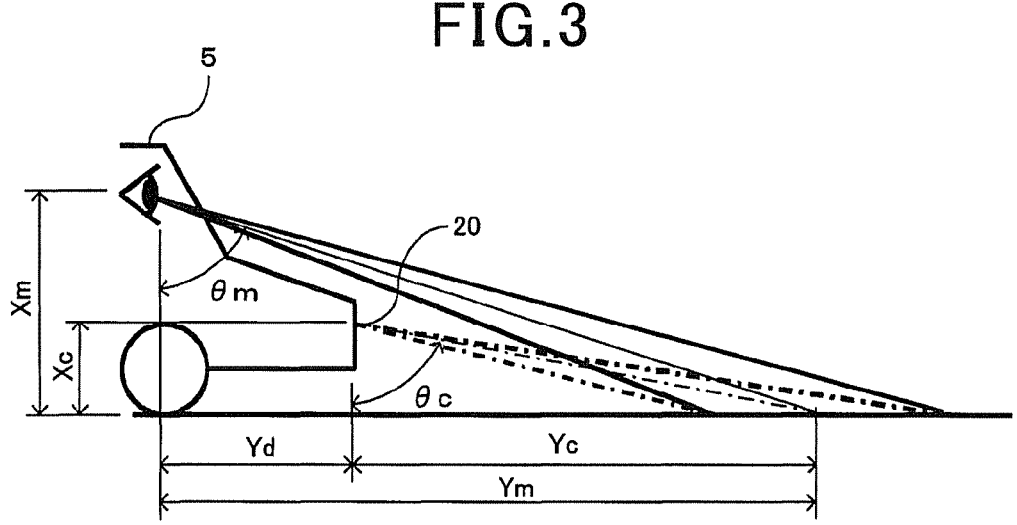
FIG. 3 is a view which shows a relationship among a driver's eye position, a position of a DMD and an illuminated surface on a road for calculating a distortion correction amount.

As shown in FIG. 3, a height of the driver's eye from the road surface is defined as Xm, and a height of a reflection surface of the light source 10 from the road surface is defined as Xc.

Further, when the driver's eye position is taken as the origin of a position parallel to the road surface, a position of the reflection surface of the light source 10 is defined as Yd, a distance from the position of the reflection surface of the light source 10 to the center of the illuminated surface on the road is defined as Yc, and a distance from the driver's eye position to the center of the illuminated surface on the road is defined as Ym.

In addition, an angle of the line connecting the driver's eye position and the center of the illuminated surface with respect to the vertical direction is defined as θm, and an angle of the line connecting the reflection position and the center of the illuminated surface with respect to the vertical direction is defined as θc.

Then, the relationship of the following equations 1 to 3 is established:

$$\tan \theta m = Ym/Xm \qquad \text{equation 1}$$

$$\tan \theta c = Yc/Xc \qquad \text{equation 2}$$

$$Ym - Yc = Yd \qquad \text{equation 3}$$

Since Xm, Xc, Yc and Yd are known, the distortion correction amount can be calculated by satisfying the equation 4.

$$\theta c - \theta m = 0 \qquad \text{equation 4}$$

Figure 4:
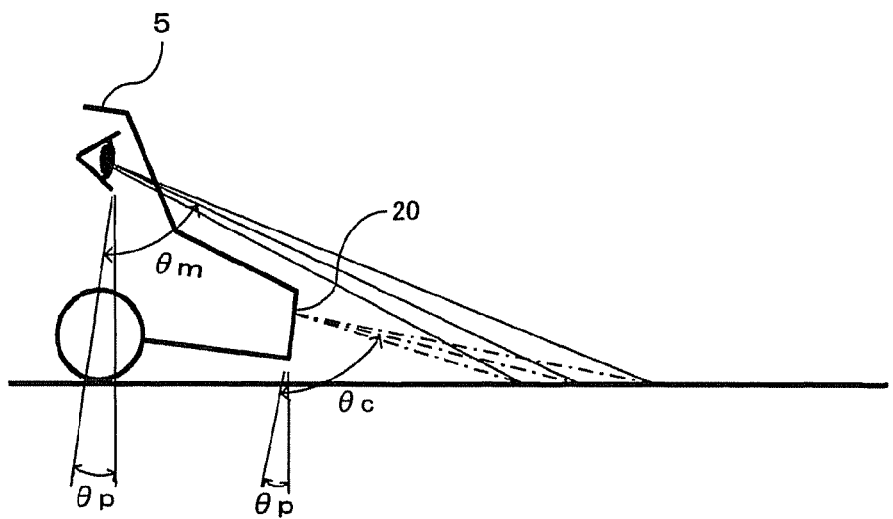
FIG. 4 is a view which shows a relationship between an angle from the driver's eye to an illuminated position on the road surface and an illumination angle of the DMD for calculating the distortion correction amount when a vehicle tilts in the pitch direction.

Further, as shown in FIG. 4, when the vehicle 5 tilts in the pitch direction and the pitch angle of the vehicle 5 obtained by the tilt angle sensor 40 is θp, the relationship between the equations 1 and 2 becomes as follows:

$$\tan(\theta m - \theta p) = Ym/Xm \quad \text{equation 5}$$

$$\tan(\theta c - \theta p) = Yc/Xc \quad \text{equation 6}$$

Therefore, the distortion correction amount can be calculated by satisfying the equations 3, 4, 5 and 6.

Then, in step S120, the distortion correction amount calculated in step S115 is output to the DMD 20 so that the DMD 20 adds contrast to distort the icon displayed in the illuminated area.

After the distortion correction amount is output to the DMD 20, the process goes to step S105 to repeat the display control processing.

The display control processing ends when the display control unit 50 is turned off.

Usually, when the headlight illuminates the road surface to display a character or icon by adding contrast of light on the road surface, the position of the light source is different from the driver's eye position. As a result, the character or icon displayed on the road surface is distorted when viewed by the driver.

According to the foregoing vehicle-mounted illumination device 1, the shape of the icon reflected by the DMD 20 is controlled so as not to be distorted when viewed from the driver's eye position by using a difference between the driver's eye position obtained by the eye position obtaining section 30 and the position of the DMD 20 stored in the ROM, that is, the reflection position of the reflected light. Accordingly, it is possible to display the icon in the illuminated area of the headlight on the road surface without distortion to the driver.

Further, the shape of the icon reflected by the DMD 20 is controlled so as not to be distorted when viewed from the driver's eye position by using the pitch angle of the vehicle obtained by the tilt angle sensor 40 in addition to the difference between the driver's eye position obtained by the eye position obtaining section 30 and the reflection position of the reflected light. Accordingly, it is possible to display the icon without distortion to the driver regardless of change in pitch angle of the vehicle.

Still further, the in-cabin camera 32 is mounted at a predetermined position in the vehicle cabin, and the driver's eye position is obtained from the image of the driver captured by the in-cabin camera 32 by an image processing performed by the image processing unit 34.

Since the mounted position of the in-cabin camera 32 is predetermined, the driver's eye position can be obtained from the driver's image captured by the in-cabin camera 32.

That is, the driver's eye position can be accurately obtained regardless of physical differences such as sitting height of the driver.

REFERENCE SIGNS LIST 1 vehicle-mounted illumination device (which is a device which displays information in an area illuminated by light ahead of a vehicle)
5 vehicle
10 light source
20 digital mirror device (DVD)
30 driver's eye position obtaining section
32 in-cabin camera
34 image processing unit
40 tilt angle sensor
50 display control unit

What is claimed is:

1. A device comprising:
a light source for a headlight that illuminates ahead of a vehicle;
a display unit that displays an icon in an illuminated area illuminated by the light source by controlling contrast of light generated by the light source;
an eye position obtaining unit that obtains a driver's eye position;
a reflection position obtaining unit that obtains a reflection position of a reflected light, the reflection position being a position where the generated light is reflected by the display unit; and
a display control unit configured to perform:
a first process for obtaining a first relative positional relationship between the driver's eye position and the illuminated area and a second-relative positional relationship between the reflection position and the illuminated area:
a second process for calculating an amount of correction of distortion caused by a difference between the first relative positional relationship and the second relative positional relationship; and
a third process for correcting a shape of the icon displayed by the display unit based on the calculated amount of correction of distortion so that the shape of the icon is undistorted when viewed from the driver's eye position.

2. The device according to claim 1, further comprising a pitch angle obtaining unit that obtains a pitch angle of the vehicle, wherein the display control unit is configured to control the shape of the icon displayed by the display unit so that the shape of the icon is undistorted when viewed from the driver's eye position by using the pitch angle obtained by the pitch angle obtaining unit in addition to the calculated amount of correction of distortion.

3. The device according to claim 1, wherein the eye position obtaining unit includes a camera that is mounted at a predetermined position in a cabin of the vehicle and an image processing unit that obtains the driver's eye position by an image processing from the image of the driver captured by the camera, and the display unit is a digital mirror device which includes a plurality of micromirrors arranged in a matrix fashion and controls contrast of light generated by the light source by reflecting or not reflecting the light generated by the light source.

4. The device according to claim 2, wherein the eye position obtaining unit includes a camera that is mounted at a predetermined position in a cabin of the vehicle and an image processing unit that obtains the driver's eye position by image processing from the image of the driver captured by the camera, and the display unit is a digital mirror device which includes a plurality of micromirrors arranged in a matrix fashion and controls contrast of light generated by the light source by reflecting or not reflecting the light generated by the light source.

5. The device according to claim 1, wherein the light source has a reflection surface, the first relative positional relationship includes a first height of the driver's eye from a surface of the illuminated area, and the second relative positional relationship includes a second height of the reflection surface of the light source from the surface of the illuminated area.

6. The device according to claim 1, wherein the light source has a reflection surface, the first relative positional relationship includes a first distance from the driver's eye position to a center of a surface of the illuminated area, and the second relative positional relationship includes a second distance from a position of the reflection surface of the light source to the center of the surface of the illuminated area.

7. The device according to claim 1, wherein the first relative positional relationship includes a first angle of a line connecting the driver's eye position and a center of a surface of the illuminated area with respect to a vertical direction, and the second relative positional relationship includes a second angle of a line connecting the reflection position and the center of the surface of the illuminated area with respect to the vertical direction.

8. The device according to claim 7, wherein the display control unit performs the second process to calculate the amount of correction of distortion based on the first angle and the second angle such that the first angle is substantially identical to the second angle.

9. A method of displaying an icon in a device which includes a light source for a headlight that illuminates ahead of a vehicle, and a display unit that displays the icon in an illuminated area illuminated by the light source by controlling contrast of light generated by the light source, the method comprising:

obtaining a driver's eye position;

obtaining a reflection position of a reflected light by the display unit; and performing:

a first process for obtaining a first relative positional relationship between the driver's eye position and the illuminated area and a second relative positional relationship between the reflection position and the illuminated area;

a second process for calculating an amount of correction of distortion caused by a difference between the first relative positional relationship and the second relative positional relationship; and a third process for correcting a shape of the icon displayed by the display unit based on the calculated amount of correction of distortion so that the shape of the icon is undistorted when viewed from the driver's eye position.

* * * * *